United States Patent Office 3,405,560
Patented Oct. 15, 1968

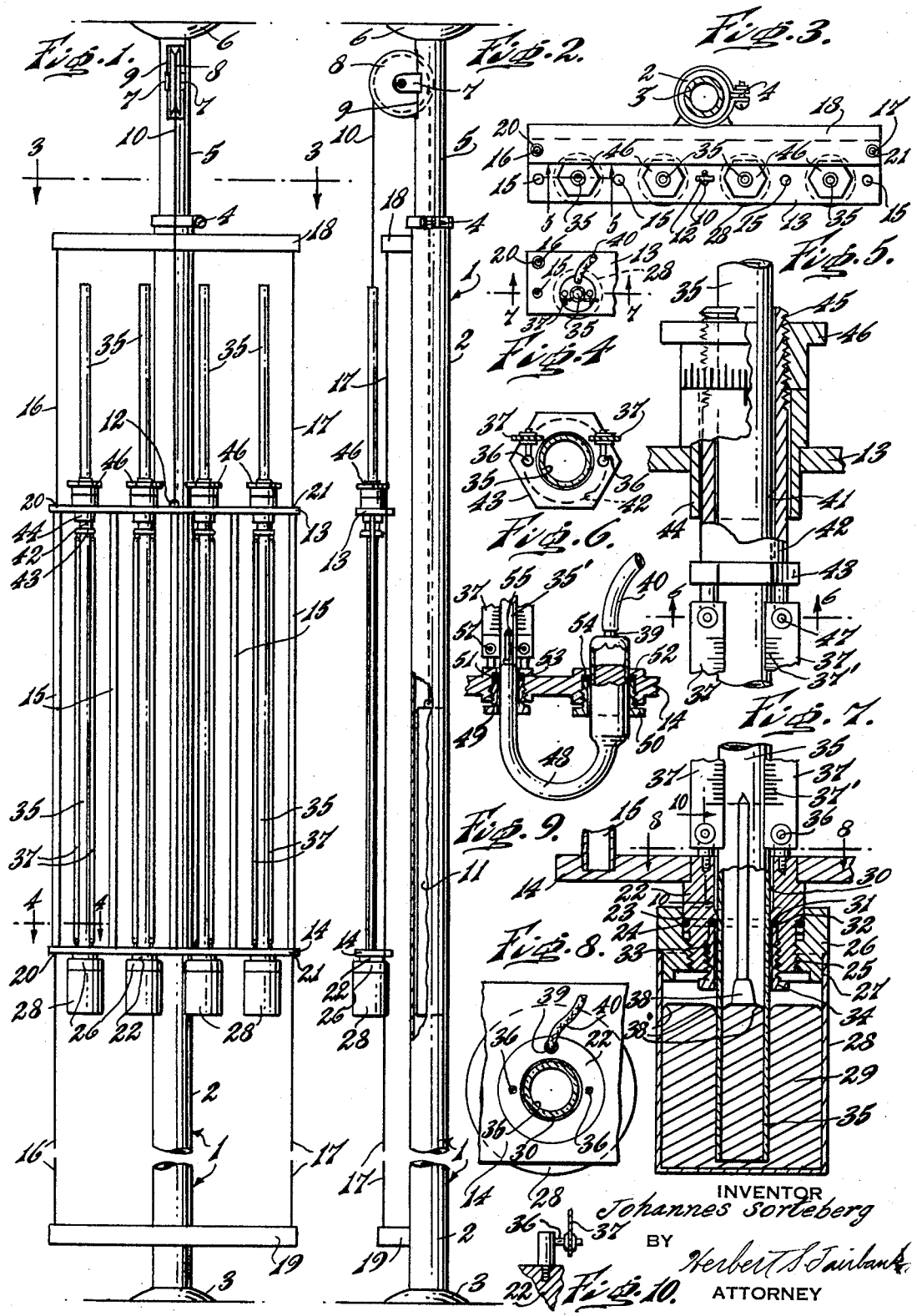

3,405,560
MANOMETER AND SUPPORTING DEVICE
Johannes Sorteberg, 80 Delafield Island Road,
Darien, Conn. 06820
Filed June 20, 1966, Ser. No. 558,837
5 Claims. (Cl. 73—401)

ABSTRACT OF THE DISCLOSURE

A manometer assembly including a group of liquid filled U-tube manometers mounted on a support structure. The support structure comprises a mechanism having a counterbalancing device for effecting the vertical adjustment of the group of manometers to an eye level reading position.

---

The object of the present invention is to devise a novel means to facilitate the use of liquid level manometers. With the ever increasing demand for accuracy in instrumentation it is often necessary to use calibrating instruments of very high accuracy, and few of them serve the purpose better, where applicable, than liquid level manometers.

Stationary manometers as presently available are not practical in many cases, as they compel the user when reading the instrument to either raise or lower his head or body to read the instrument, or read the instrument from a great distance with a telescope.

In order for the operator or calibrating technician to make efficient use of the manometer I have therefore made a counter-balanced arrangement so that the manometers proper may be moved up and down. Thus, the operator may remain seated and read the instrument at eye level.

Other objects of the invention will hereinafter clearly appear in the detailed description and the appended claims.

For the purpose of illustrating the invention, I have shown in the accompanying drawings preferred embodiments of it, which I have found in practice to give satisfactory and reliable results. It is, however, to be understood that the various instrumentalities of which the invention consists can be variously arranged and organized and the invention is not limited, except by the scope of the appended claims, to the exact arrangement and organization of these instrumentalities as herein set forth.

With the foregoing and other objects in view, as will hereinafter more clearly appear, my invention comprises a novel manometer and its mounting.

FIGURE 1 is a front elevation showing the principal elements of which the invention consists.

FIGURE 2 is a side elevation of FIGURE 1, partly broken away to show the counter-balance weight.

FIGURE 3 is a sectional top plan view, the section being taken on line 3—3 of FIGURE 1.

FIGURE 4 is a section on line 4—4 of FIGURE 1.

FIGURE 5 is a fragmentary section on an enlarged scale, the section being taken substantially on line 5—5 of FIGURE 3.

FIGURE 6 is a section on line 6—6 of FIGURE 5.

FIGURE 7 is a fragmentary section on an enlarged scale, the section being taken substantially on line 7—7 of FIGURE 4.

FIGURE 8 is a section on line 8—8 of FIGURE 7.

FIGURE 9 is a fragmentary section on an enlarged scale of a modified form of the invention, in which the manometer tubes terminate in a U formation.

FIGURE 10 is a section on line 10—10 of FIGURE 7.

Similar numerals of reference indicate corresponding parts.

Referring to the drawings:

The manometer mounting consists of a supporting column 1, in the form of telescoping tubes, the outer tube 2 being provided with a suction cup 3 at its base and a clamping device 4 at its upper end. The inner bore of the outer tube is adapted to receive an inner tube 5, said tube 5 being adapted to be clamped in adjusted position by clamping device 4. The upper part of tube 5 is also provided with a suction cup 6. The upper part of tube 5 has fixed to it in any desired manner, such as by welding, brackets 7, adapted to rotatably support a pulley 8, said pulley entering a slot 9 in tube 5. The pulley 8 is adapted to receive a cable 10 connected at one end with a counter-weight 11, which rides in tube 2. The opposite end of cable 10 is connected at 12 with a cross bar 13, said cross bar being connected with a lower cross bar 14, both bars being held in spaced relationship by struts 15. The resulting frame which is formed from the upper cross bar 13 and lower cross bar 14, connected by struts 15, is adapted to be guided and retained in its vertical movement by guy wires 16 and 17, said wires being stretched between arms 18 and 19, fixed to the upper and lower end of outer tube 2, said cross bars having apertures 20 and 21 to receive said guy wires.

The lower cross bar 14 is adapted to receive at spaced intervals between the struts 15, and in fixed relationship, a retaining member 22, having intermediate its length an annular recess 23, adapted to receive an O-ring 24, and being threaded at its lower end at 25 to receive in threaded engagement a member 26, said member 26 having a portion of reduced diameter at its lower end to receive in fixed relationship as at 27, a well or cup 28, which preferably contains mercury 29, but which may contain any other desired type of mobile fluid. The retaining member 22 is provided with a bore 30, and intermediate its length an annular recess 31 to receive an O-ring 32, the lower end of said bore being threaded at 33 to receive a gland 34, adapted to exert pressure against O-ring 32, which in turn exerts pressure against a manometer tube 35 to retain it in fixed relationship in the cross bar 14. The upper end of the retaining member 22 is adapted to receive and lock tapes 37 having scales 37', said tapes being made of a material of suitable resiliency so as to permit stretching, but which would return to its original length when the tension was reduced to its original position. The scale graduations may, for instance, be in p.s.i. on the left and kg./cm.$^2$ on the right.

A float 38, floating on the mobile fluid, makes the meniscus 38' of the liquid in the tube readable at all times above the well. The upper end of the retaining member 22 is also provided with a pressure connection 39, connected to a tube 40.

The manometer tube 35, open at its top and bottom, is held in position at its upper end in the upper cross bar 13, by the bore 41 of a member 42, said member being in the form of a tube terminating at its lower end in a flange 43. The outer diameter of the tube is retained in a member 44 which is held in fixed position on the cross bar 13. The upper end of the tube is threaded as at 45 to receive a nut 46 which is graduated in degrees C. or F. on its periphery. The lower end of the tube which terminates in the flange 43, is also provided with members 47, fixed thereto, and which are similar to the members 36 at the lower end of the tapes and are adapted to retain the tapes in locked position on the flange 43. When the nut 46 is tightened on tube 42, it will result in the stretching of the tapes and scales 37. This scale stretching mechanism is used for compensation of the instrument for variation in the specific gravity of the liquid as the ambient temperature changes.

In the form shown in FIGURE 9, the manometer tubes 35' terminate at their lower end in a U tube as shown at 48, said U tube being held in adjusted position on lower cross bar 14 by glands 49 and 50 in threaded engagement with the cross bar 14, said cross bar having annular recesses 51 and 52 to receive O-rings 53 and 54, which exert pressure on the U tube to retain it is fixed position. Float 55 floats on the liquid in the left branch of the U tube. Suitable locking means 57 are fixed to the cross bar 14 to lock the scales in position.

The manometer tubes may be arranged in groups, as shown in the drawings, or they may be arranged singly.

Having thus described my invention, what I claim as new and desire to secure by Letters Patent is:

1. A manometer arrangement comprising a group of liquid level manometers, each manometer consisting of a manometer tube, a well for each manometer tube, pressure connections for said manometer, suitable liquid in said tube and its well, a support for the manometer group providing for its adjustment to convenient reading position and counter balancing means acting on said group to retain it in its adjusted reading position.

2. The construction defined in claim 1, wherein the means for reading the liquid level difference in each manometer consists of a scale alongside each manometer tube, a thin horizontal disc within said tube rigidly connected to a float representing the liquid level meniscus, arranged to minimize parallax by having the graduations on the scale in approximately the same plane as a tangent to the near edge of the disc would generate when traveling up or down parallel to the plane surface of the scale.

3. The construction defined in claim 1, wherein the manometer tubes are in the form of U-tubes.

4. The construction defined in claim 1, wherein any manometer tube is provided with two scales, one on either side of said tube.

5. The construction defined in claim 1, wherein the manometer tubes are in the form of U-tubes and the means for reading the liquid level difference in each manometer consists of a scale alongside one branch of the manometer U-tube, a thin horizontal disc within said branch rigidly connected to a float representing the liquid level meniscus in said branch, arranged to minimize parallax by having the graduations on the scale in approximately the same plane as a tangent to the near edge of the disc would generate when traveling up or down parallel to the plane surface of the scale.

References Cited

UNITED STATES PATENTS

| | | | |
|---|---|---|---|
| 1,257,964 | 3/1918 | Bailey | 73—401 |
| 1,775,227 | 9/1930 | Riggs | 73—401 XR |
| 2,550,701 | 5/1951 | Lardy. | |
| 2,680,060 | 6/1954 | Natelson. | |
| 3,020,757 | 2/1962 | Parish | 73—401 XR |
| 3,315,527 | 4/1967 | Foster-Pegg | 73—401 |

S. CLEMENT SWISHER, *Acting Primary Examiner.*

DONALD O. WOODIEL, *Assistant Examiner.*